United States Patent [19]

Nagano et al.

[11] Patent Number: 4,742,099
[45] Date of Patent: May 3, 1988

[54] POLYIMIDE FILM AND PROCESS FOR PRODUCING SAME

[75] Inventors: Hirosaku Nagano, Ohtsu; Junji Takase, Kobe; Hideki Kawai, Ohtsu; Hitoshi Nojiri, Ohtsu; Tsuneo Yamamoto, Ohtsu, all of Japan

[73] Assignee: Kanegafuchi Kagaku Kogyo Kabushiki Kaisha, Osaka, Japan

[21] Appl. No.: 936,524

[22] Filed: Dec. 1, 1986

[30] Foreign Application Priority Data

Nov. 29, 1985 [JP] Japan .................. 60-270118

[51] Int. Cl.$^4$ .......................... C08K 5/52; C08K 5/04
[52] U.S. Cl. .................................. 524/115; 524/127; 524/128; 524/140; 524/141; 524/148; 524/166; 524/398
[58] Field of Search ............... 524/115, 127, 128, 140, 524/141, 148, 166, 398

[56] References Cited

U.S. PATENT DOCUMENTS

| | | | |
|---|---|---|---|
| 4,069,192 | 1/1978 | Monte et al. | 524/140 |
| 4,240,941 | 12/1980 | Jablonski et al. | 524/600 |
| 4,277,415 | 7/1981 | Sugerman et al. | 524/128 |
| 4,424,294 | 1/1984 | Poppe | 524/398 |

*Primary Examiner*—Lewis T. Jacobs
*Attorney, Agent, or Firm*—Armstrong, Nikaido, Marmelstein & Kubovcik

[57] ABSTRACT

A new polyimide film which contains 30 to 800 ppm of titanium based on the weight of the film, and a process for producing a new polyimide film which comprises introducing an organic titanium compound substance into the film-forming polyimide resin prior to the casting step. This process enables one to control the film surface forming process and improve directly the adhesive properties of the film.

4 Claims, No Drawings

POLYIMIDE FILM AND PROCESS FOR PRODUCING SAME

BACKGROUND OF THE INVENTION

1. Field of the Invention

The present invention relates to a heat-resistant polyimide film, and more particularly, it relates to a new polyimide film and a process for producing the same, said polyimide film being improved in adhesive properties through the introduction of a special titanium-based organometallic compound which controls the surface forming process.

2. Description of the Prior Art

Polyimide film is known for its outstanding properties such as heat resistance, low-temperature resistance, chemical resistance, electrical insulation, and mechanical strength. It is widely used as heat insulation film, electrical insulating film, and base film of flexible printed-wiring board. In the last two application areas, polyimide film is usually bonded to a copper foil with an adhesive or coated with an adhesive. Therefore, the adhesive property is an important performance required for polyimide film.

The conventional technology for imparting adhesive properties to high polymer film includes flame treatment, corona treatment, UV rays treatment, alkali treatment, primer treatment, and sandblasting.

Polyimide film undergoes such conventional sandblasting and alkali treatment so that it meets the requirements for heat-resistant film.

Since these treatments are designed to be performed after the film has been completed, the adhesion strength achieved by the treatment varies depending on the adhesive properties of the original film and the uniformity of post treatment. Therefore, they are not suitable for producing film with improved adhesive properties. In addition, they lead to a cost increase because they need additional steps.

SUMMARY OF THE INVENTION

It is an object of the present invention to provide a new polyimide film with improved adhesive properties which is produced by controlling the film surface forming process.

It is another object of the present invention to provide a process for producing a new polyimide film with improved adhesive properties which comprises introducing a specific titanium-based organometallic compound into a polyimide resin prior to the casting step.

These and other objects and advantages of the invention will become more apparent in the detailed description and examples which follow.

DETAILED DESCRIPTION OF THE INVENTION

The first aspect of the invention consists in a new polyimide film which comprises 30 to 800 ppm of titanium based on the weight of the film. The second aspect of the invention consists in a process for producing a new polyimide film which comprises introducing 0.1 to 2.0 wt% of at least one kind of the titanium-containing substances of the following structural formula (I) or (II) into the film-forming polyimide resin prior to the casting step.

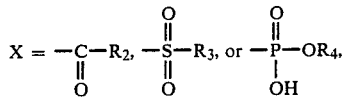

where:
m = 0 to 4

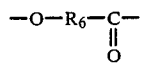

$R_1 = C_3-C_{18}$ hydrocarbon residue, $-O-R_5-$, or

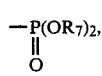

$R_2, R_3 = C_3-C_{18}$ hydrocarbon residue
$R_4 = C_3-C_{13}$ hydrocarbon residue or

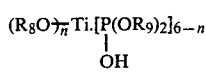

$R_5, R_6 = C_1-C_8$ hydrocarbon residue
$R_7 = C_2-C_{18}$ hydrocarbon residue $$(R_8O)_{\overline{n}}Ti.[P(OR_9)_2]_{6-n} \atop OH \qquad (II)$$

where
n = 0 to 6
$R_8 = C_3-C_{18}$ hydrocarbon residue or $-R_{10}-O-R_{11}-$
$R_9 = C_3-C_{18}$ hydrocarbon residue
$R_{10}, R_{11} = C_1-C_8$ hydrocarbon residue As mentioned above, according to the conventional technology, the improvement in adhesive properties of polymer film is accomplished mainly by post-treatment, and polyimide film is no exception. It undergoes sandblasting and alkali treatment for post-treatment. In the case of polyimide film produced without such post-treatment, the failure of adhesion takes place as the result of the breakage of the surface layer of polyimide film. And the strength of the surface film is determined by the surface forming step in the film producing process. The weak surface layer can be removed by sandblasting or alkali treatment. The present invention was completed as the result of investigation on the suppression or reduction of the weak layer.

The titanium-containing substances used in this invention are those which have the following structural formula (I) or (II). One or more than one kind of the titanium-containing substances may be used.

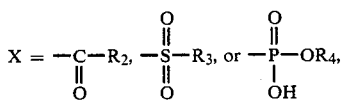

where:
m = 0 to 4

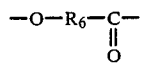

$R_1 = C_3-C_{18}$ hydrocarbon residue, $-O-R_5-$, or

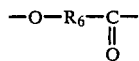

$R_2$, $R_3 = C_3-C_{18}$ hydrocarbon residue
$R_4 = C_3-C_{13}$ hydrocarbon residue or

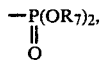

$R_5$, $R_6 = C_1-C_8$ hydrocarbon residue
$R_7 = C_2-C_{18}$ hydrocarbon residue

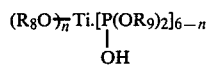 (II)

where
n = 0 to 6
$R_8 = C_3-C_{18}$ hydrocarbon residue or $-R_{10}-O-R_{11}-$
$R_9 = C_3-C_{18}$ hydrocarbon residue
$R_{10}$, $R_{11} = C_1-C_8$ hydrocarbon residue
Those substances having the following structural formula are preferable.

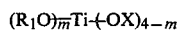

where: m = 1 to 2

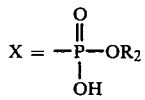

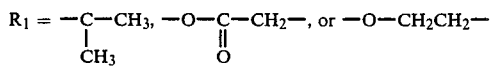

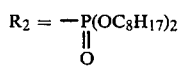

More preferable substances are isopropyltris(dioctylpyrophosphate)titanate, bis(dioctylpyrophosphate)ethylene titanate, bis(dioctylpyrophosphate)oxyacetate titanate, and diisopropylbis(dioctylpyrophosphate)titanate, and mixtures thereof.

The polyimide resin used in this invention is one which can be obtained from known raw materials. It includes thermosetting polyimides and aromatic polyimides. From the standpoint of balanced properties, however, it should preferably be one which is composed mainly of pyromellitic dianhydride and 4,4'-diaminodiphenyl ether.

The new polyimide film of this invention contains 30 to 800 ppm of titanium based on the weight of the film. The amount of titanium should preferably be 100 to 800 ppm, and more preferably 150 to 600 ppm. With an amount of titanium less than 30 ppm, the polyimide film is improved only a little in adhesive properties. With an amount of titanium more than 800 ppm, the polyimide film is poor in tensile strength and other properties. The amount of titanium can be determined by the ordinary analytical method.

The polyimide film of this invention can be obtained by introducing 0.1 to 2.0 wt% of the above-mentioned titanium-containing substance into the film-forming polyimide resin prior to the casting step.

In the case where the titanium-containing substance is introduced at the intermediate stage of polyamide acid, the amount should be established on the assumption that the polyamide acid is completely converted into polyimide eventually. In other words, this amount is a charge which is not based on the weight of polyimide film to be eventually formed. With an amount less than 0.1 wt%, the polyimide film is improved only a little in adhesive properties. With an amount in excess of 2.0 wt%, the polyimide film is poor in tensile strength and other properties. A preferred amount is 0.2 to 1.0 wt%.

The titanium-containing substance should preferably be introduced, prior to the casting step, into polyamide acid varnish or polyimide varnish, or while the polymerization of polyamide acid or polyimide is being performed, although it is within the scope of this invention to apply it to the film surface by spraying immediately after casting.

The casting of polyimide film can be accomplished in various manners. For example, (a) casting from polyimide varnish, (b) forming from polyamide acid varnish by the application of heat only, and (c) forming by mixing polyamide acid varnish with a chemical converting agent. In the case of (a) or (b), it is convenient to add the titanium-containing substances directly into the varnish. In the case of (c), is is convenient to add it directly into the converting agent. The method (c) is most effective in improving the adhesive properties. This fact suggests that the surface forming process involves a very complex technical matter.

The titanium-containing substance used in this invention does not improve the adhesive properties if it is coated onto the film which has or has not undergone post treatment. This apparently indicates that it works in a manner different from the known coupling mechanism (which forms the chemical bond between the polyimide surface and the adhesive). It is considered that said substance introduced prior to the casting step greatly affects the surface forming process and suppresses the formation of the weak surface layer. In addition, the substance should undergo certain chemical change because it is subjected to high temperature (close to 400° C.) in the film making process. This will also support the above presumption.

The present invention makes it possible to impart adhesive properties to polyimide film which has the highest heat resistance among plastics films. This is accomplished by introducing a specific titanium-based organometallic compound, which is normally poor in thermal resistance, in the course of polyimide film production. The compound controls the surface forming process of the polyimide film while the characteristic properties of polyimide film are retained. Thus, the present invention provides polyimide film having uniform adhesive properties.

The invention is now described in more detail with reference to the following examples, which are not intended to limit the scope of the invention.

EXAMPLES 1 TO 7 AND COMPARATIVE EXAMPLE 1

A 50-μm thick polyimide film was produced by the known method from polyamide acid varnish composed of pyromellitic dianhydride and 4,4'-diaminodiphenyl ether, after the addition of a titanium-containing substance in an amount of 1.0 wt% (based on the weight of polyimide). For comparison, the same film was produced from the same raw material without the addition of titanium-containing substance.

The resulting film was examined for characteristic properties. The results are shown in Table 1. It is noted from Table 1 that the filmof this invention is improved in adhesive properties without the substantial decrease in other characteristic properties.

EXAMPLES 8 TO 10 AND COMPARATIVE EXAMPLES 2 TO 4

The procedure in Examples 1 to 7 was repeated except that the amount of isopropyltris(dioctylpyrophosphate)titanate was varied. For comparison, the same procedure was repeated except that the compound was used in an amount less than 0.1 wt% or more than 2.0 wt%, or the compound was not used. The results are shown in Table 1.

EXAMPLES 11 TO 13

The procedure in Examples 1 to 7 was repeated except that 1.0 wt% of bis(dioctylpyrophosphate)ethylene titanate was added to different kinds of polyamide acids. The resulting films were examined for adhesive properties. The results are shown in Table 1.

EXAMPLE 14 AND COMPARATIVE EXAMPLES 5 AND 6

The procedure in Examples 1 to 7 was repeated except that 1.0 wt% of bis(dioctylpyrophosphate)oxyacetate titanate was used in combination with a mixture of acetic anhydride (4.0 mole based on polyamide acid) and pyridine (0.5 mole based on polyamide acid), as a chemical converting agent. For comparison, the same procedure was repeated except that the titanate and mixture were not added. For further comparison, the film produced without adding the titanate and mixture was coated with the titanate and mixture. The resulting films were examined for adhesive properties. The results are shown in Table 1.

TABLE 1

| Example No. | Acid anhydride[*1] | Diamine[*2] | Titanium compound (wt %)[*3] | Titanium content (ppm)[*4] | Adhesive properties[*5] A | B | Tensile strength[*6] kg/mm$^2$ | Elongation (%)[*6] | Retention of elongation (%)[*7] |
|---|---|---|---|---|---|---|---|---|---|
| Example 1 | PMDA | ODA | A 1.0 | 501 | 1.3 | 1.5 | 15.9 | 28 | 46 |
| Example 2 | PMDA | ODA | B 1.0 | 365 | 1.4 | 1.4 | 18.7 | 35 | 50 |
| Example 3 | PMDA | ODA | C 1.0 | 526 | 1.8 | 1.8 | 16.5 | 38 | 61 |
| Example 4 | PMDA | ODA | D 1.0 | 518 | 2.0 | 2.2 | 17.2 | 41 | 52 |
| Example 5 | PMDA | ODA | E 1.0 | 442 | 1.5 | 1.2 | 16.6 | 37 | 47 |
| Example 6 | PMDA | ODA | F 1.0 | 534 | 1.4 | 1.2 | 18.5 | 45 | 39 |
| Example 7 | PMDA | ODA | G 1.0 | 329 | 1.8 | 1.4 | 17.5 | 42 | 50 |
| Compar. Example 1 | PMDA | ODA | none | 0 | 1.2 | 0.9 | 19.1 | 42 | 53 |
| Compar. Example 2 | PMDA | ODA | B 0.05 | 19 | 0.9 | 0.7 | 18.4 | 37 | 55 |
| Example 8 | PMDA | ODA | B 0.10 | 37 | 1.4 | 1.3 | 16.7 | 33 | 57 |
| Example 9 | PMDA | ODA | B 1.00 | 365 | 1.6 | 1.5 | 15.9 | 45 | 53 |
| Example 10 | PMDA | ODA | B 2.00 | 731 | 1.8 | 1.6 | 15.2 | 30 | 43 |
| Compar. Example 3 | PMDA | ODA | B 5.00 | 1827 | C/A | C/A | 12.1 | 10 | 23 |
| Compar. Example 4 | PMDA | ODA | none | 0 | 1.0 | 0.7 | 17.3 | 35 | 63 |
| Example 11 | PMDA | PPD | C 1.0 | 526 | 1.5 | 1.3 | 25.8 | 37 | 64 |
| Example 12 | BPDA | ODA | C 1.0 | 526 | 1.4 | 1.8 | 22.6 | 70 | 57 |
| Example 13 | BPDA | PPD | C 1.0 | 526 | 1.2 | 1.3 | 28.1 | 27 | 65 |
| Example 14 | PMDA | ODA | D 1.0 | 518 | 2.1 | 2.3 | 23.6 | 63 | 56 |
| Compar. Example 5 | PMDA | ODA | none | 0 | 1.5 | 0.8 | 24.2 | 65 | 51 |
| Compar. Example 6 | PMDA | ODA | coating | — | — | 0.7 | — | — | — |

Note to Table 1
[*1]PMDA: pyromellitic dianhydride
   BPDA: 3,3',4,4'-biphenyltetracarboxylic acid dianhydride
[*2]ODA: 4,4'-diaminodiphenylether
   PPD: paraphenylene diamine
[*3]A: isopropyltrisisotearoyl titanate
   B: isopropyltris(dioctylpyrophosphate) titanate
   C: bis(dioctylpyrophosphate)ethylene titanate
   D: bis(dioctylpyrophosphate)oxyacetate titanate
   E: isopropyltridodecylbenzenesulfonyl titanate
   F: tetrapropylbis(dioctylphosphite) titanate
   G: tetraoctylbis(ditridecylphosphite) titanate
[*4]measured using a 25-μm thick film by fluorescence X-ray analysis
[*5]adhesive: nylon/epoxy adhesive, 30-μm thick
   copper foil: 1-ounce electrolytic copper foil
   width of copper foil: 5 mm
   peeling: 90° peeling, 50 mm/min
   failure of adhesion: Failure that took place at the interface
   between the film and the adhesive is indicated by numerals.
   Failure that took place at the interface between the copper foil
   and the adhesive is indicated by C/A. A and B denote the surface
   which was examined for adhesive properties.
[*6]Film width: 15 mm
   Chuck distance: 100 mm
   Pulling rate: 50 mm/min
[*7]indicated by the ratio of elongation measured (in the same manner
   as in (6)) after heat treatment at 300° C. for 7 days to elongation
   measured without heat treatment.

The surface infrared analysis using a Ge prism indicates that there is a polyimide layer on the surface of adhesive failure in Comparative Example 5, whereas it is not observed in the case of Example 14, which presumably shows that the introduction of titanium varies the surface forming process whereby formation of the weak surface layer is suppressed.

What is claimed is:

1. A polyimide film comprising at least one organic titanium compound selected from the group consisting of compounds of formula (I) and compounds of formula (II):

$$(R_1O)_{\overline{m}}Ti(-OX)_{4-m} \qquad (I)$$

wherein
m=0 to 4

$$X = -\underset{\underset{O}{\|}}{C}-R_2, -\underset{\underset{O}{\|}}{\overset{O}{\underset{\|}{S}}}-R_3, \text{ or } -\underset{\underset{OH}{|}}{\overset{O}{\underset{\|}{P}}}-OR_4,$$

$R_1 = C_3\text{-}C_{18}$ hydrocarbon residue,
$R_2, R_3 = C_3\text{-}C_{18}$ hydrocarbon residue,
$R_4 = C_3\text{-}C_{13}$ hydrocarbon residue or $$-\underset{\underset{O}{\|}}{P}(OR_7)_2,$$

$R_7 = C_2\text{-}C_{18}$ hydrocarbon residue; and $$(R_8O)_{\overline{n}}Ti\cdot[P(OR_9)_2]_{6-n} \qquad (II)$$
$$\underset{OH}{|}$$

wherein
n=0 to 6
$R_8 = C_3\text{-}C_{18}$ hydrocarbon residue,
$R_9 = R_3\text{-}C_{18}$ hydrocarbon residue,
$R_{10}, R_{11} = C_1\text{-}C_8$ hydrocarabon residue;
the amount of titanium in said polyimide film being 30 to 800 ppm expressed in terms of titanium element based on the weight of the film.

2. A polyimide film as claimed in claim 1, wherein the organic titanium compound is selected from the group consisting of isopropyltris(dioctylpyrophosphate)titanate, bis(dioctylpyrophosphate)ethylene titanate, bis(dioctylpyrophosphate)oxyacetate titanate, diisopropylbis(dioctylpyrophosphate)titanate, and mixtures thereof.

3. A process for producing a polyimide film which comprises introducing into a film-forming polyimide resin prior to casting the resin at least one organic titanium compound selected from the group consisting of compounds of formula (I) and compounds of formula (II):

$$(R_1O)_{\overline{m}}Ti(-OX)_{4-m} \qquad (I)$$

wherein
m=0 to 4

$$X = -\underset{\underset{O}{\|}}{C}-R_2, -\underset{\underset{O}{\|}}{\overset{O}{\underset{\|}{S}}}-R_3, \text{ or } -\underset{\underset{OH}{|}}{\overset{O}{\underset{\|}{P}}}-OR_4,$$

$R_1 = C_3\text{-}C_{18}$ hydrocarbon residue,
$R_2, R_3 = C_3\text{-}C_{18}$ hydrocarbon residue,
$R_4 = C_3\text{-}C_{13}$ hydrocarbon residue or $$-\underset{\underset{O}{\|}}{P}(OR_7)_2,$$

$R_7 = C_2\text{-}C_{18}$ hydrocarbon residue; and $$(R_8O)_{\overline{n}}Ti\cdot[P(OR_9)_2]_{6-n} \qquad (II)$$
$$\underset{OH}{|}$$

wherein n=0 to 6
$R_8 = C_3\text{-}C_{18}$ hydrocarbon residue,
$R_9 = C_3\text{-}C_{18}$ hydrocarbon residue,
$R_{10}, R_{11} = C_1\text{-}C_8$ hydrocarbon residue.

4. A process for producing a polyimide film as claimed in claim 3 wherein the organic titanium compound is selected from the group consisting of isopropyltris(dioctylpyrophosphate)titanate, bis(dioctylpyrophosphate)ethylene titanate, bis(dioctylpyrophosphate)oxyacetate titanate, diisopropylbis(dioctylpyrophosphate)titanate, and mixtures thereof.

* * * * *

UNITED STATES PATENT AND TRADEMARK OFFICE
CERTIFICATE OF CORRECTION

PATENT NO. : 4,742,099
DATED : May 3, 1988
INVENTOR(S) : Hirosaku NAGANO et al

It is certified that error appears in the above-identified patent and that said Letters Patent is hereby corrected as shown below:

On the cover page, Item [75], after "Tsuneo Yamamoto, Ohtsu,", insert --Kazuya Yonezawa, Kobe,--.

Claim 1, column 7, line 36 delete "$R_{10}$, $R_{11}=C_1-C_8$ hydrocarbon redidue".

Claim 3, column 8, line 36, delete "$R_{10}$, $R_{11}=C_1-C_8$ hydrocarbon residue".

Signed and Sealed this

Eighth Day of November, 1988

Attest:

DONALD J. QUIGG

*Attesting Officer*    *Commissioner of Patents and Trademarks*